United States Patent
Bisror et al.

(10) Patent No.: US 8,919,473 B2
(45) Date of Patent: Dec. 30, 2014

(54) MOTOR VEHICLE CHASSIS

(75) Inventors: Olivier Bisror, Le Plessis Robinson (FR); Thomas Mauduit, Voisins le Bretonneux (FR); Guillaume Camus, Guyancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 191 days.

(21) Appl. No.: 13/811,761

(22) PCT Filed: Jul. 11, 2011

(86) PCT No.: PCT/FR2011/051644
§ 371 (c)(1),
(2), (4) Date: Mar. 12, 2013

(87) PCT Pub. No.: WO2012/010770
PCT Pub. Date: Jan. 26, 2012

(65) Prior Publication Data
US 2013/0180790 A1   Jul. 18, 2013

(30) Foreign Application Priority Data
Jul. 23, 2010   (FR) ..................................... 10 56043

(51) Int. Cl.
*B60R 16/04* (2006.01)
*B62D 21/00* (2006.01)
*B62D 25/20* (2006.01)
*B60N 2/005* (2006.01)
*B60N 2/06* (2006.01)
*B60K 1/04* (2006.01)

(52) U.S. Cl.
CPC ............... *B62D 25/20* (2013.01); *B60N 2/005* (2013.01); *B60N 2/06* (2013.01); *B62D 25/2036* (2013.01); *B60K 1/04* (2013.01)
USPC ........................................ 180/68.5; 180/311

(58) Field of Classification Search
USPC ................... 180/68.5, 311, 312, 65.1, 65.21; 296/209, 203.01, 203.03, 193.07, 204, 296/29
See application file for complete search history.

(56) References Cited

U.S. PATENT DOCUMENTS 5,392,873 A * 2/1995 Masuyama et al. .......... 180/68.5
7,051,825 B2 * 5/2006 Masui et al. .................. 180/68.5
(Continued)

FOREIGN PATENT DOCUMENTS

DE   44 17 470   5/1995
EP   0 619 215   10/1994
(Continued)

OTHER PUBLICATIONS

U.S. Appl. No. 13/811,777, filed Apr. 4, 2013, Tabuteau, et al.
(Continued)

*Primary Examiner* — Jeffrey J Restifo
*Assistant Examiner* — James M Dolak
(74) *Attorney, Agent, or Firm* — Oblon, Spivak, McClelland, Maier & Neustadt, L.L.P.

(57) ABSTRACT

A motor vehicle chassis including two valance lateral flanks including a horizontal portion for attachment to a central floor situated between the two lateral flanks, at least one horizontal beam for accepting seats which is mounted on the raised central floor of the vehicle, and a housing for an energy reservoir situated under a horizontal main surface of the central floor, the horizontal portions of the valance and the main surface of the central floor having a height difference. The chassis further includes connecting elements arranged on each side of the chassis and including a flat portion fixed to the central floor and an inclined portion fixed to one end of the horizontal beam, the inclined and flat portions being joined together and produced as a single piece, and the connecting element being fixed to the horizontal beam and to the central floor respectively, using welding.

8 Claims, 3 Drawing Sheets

(56) References Cited

U.S. PATENT DOCUMENTS

Figure 1:
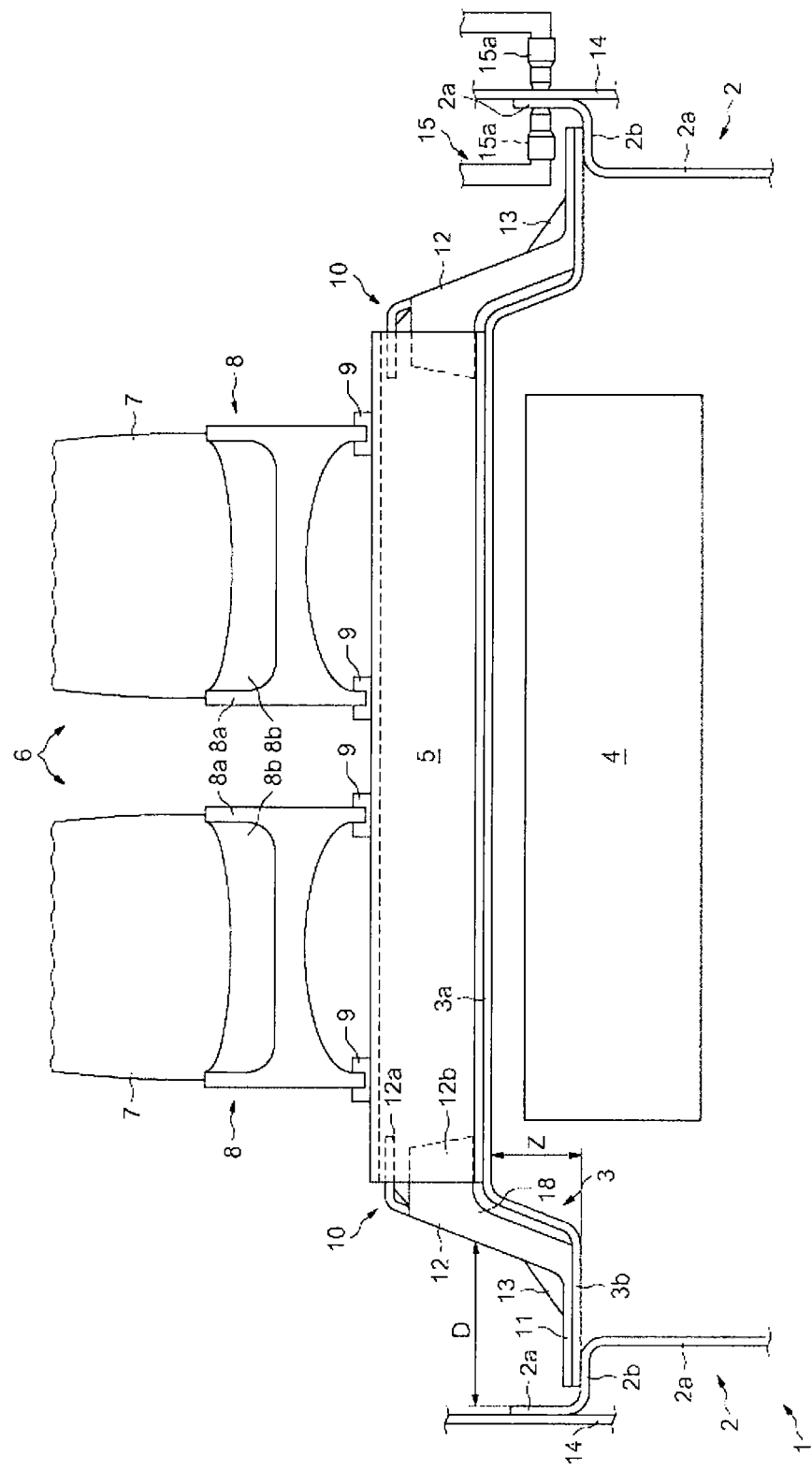

| | | | |
|---|---|---|---|
| 7,281,755 B2 * | 10/2007 | Coakley | 296/187.08 |
| 7,568,755 B2 * | 8/2009 | Imada et al. | 296/187.11 |
| 7,610,978 B2 * | 11/2009 | Takasaki et al. | 180/68.5 |
| 7,654,352 B2 * | 2/2010 | Takasaki et al. | 180/68.5 |
| 7,836,999 B2 * | 11/2010 | Kato | 180/312 |
| 7,997,368 B2 * | 8/2011 | Takasaki et al. | 180/68.5 |
| 8,012,620 B2 * | 9/2011 | Takasaki et al. | 429/100 |
| 8,079,435 B2 * | 12/2011 | Takasaki et al. | 180/68.5 |
| 8,118,125 B2 * | 2/2012 | Suzuki et al. | 180/68.5 |
| 8,561,743 B2 * | 10/2013 | Iwasa et al. | 180/68.5 |

FOREIGN PATENT DOCUMENTS

| | | |
|---|---|---|
| EP | 1 657 098 | 5/2006 |
| WO | 2009 062405 | 5/2009 |

OTHER PUBLICATIONS

U.S. Appl. No. 13/811,762, filed Apr. 2, 2013, Tabuteau, et al.
U.S. Appl. No. 13/811,808, filed Apr. 4, 2013, Mauduit, et al.
U.S. Appl. No. 13/811,750, filed Mar. 21, 2013, Bisror, et al.
French Search Report Issued Mar. 28, 2011 in French Patent Application 1056043 Filed Jul. 23, 2010.

* cited by examiner

MOTOR VEHICLE CHASSIS

The invention falls within the field of chassis for motor vehicles, notably electrically powered or hybrid motor vehicles. In order to ensure that the electrically powered or hybrid vehicles have sufficient range, accumulator batteries have to be carried on board. The volume of these batteries is significantly greater than the volume occupied by a traditional reserve of energy such as a fuel tank for example.

One solution is to make use of a volume delimited under the passenger seat, by modifying the profile of the floor in such a way as to isolate this volume from the passenger compartment. The passenger seat then rests directly on a raised region of the floor. The height of the seat may be the same as in vehicles of the same range built to be powered by a combustion engine, or may be higher.

Patent application JP 07 156 826 thus describes a chassis structure for an electrically powered motor vehicle, in which structure a volume under the front and rear passenger seats is set aside for the battery by separating this volume from the passenger compartment. Vertical raiser plates are positioned at the front and at the rear of the seats. A raised floor seating region extends between these vertical raiser plates and lateral raiser supports fixed to the lateral flanks of the bodywork.

Such a structure cannot be applied to a three-door vehicle because the rear passenger seats need to be flanked by fixed bodywork flanks, to which the lateral raiser supports are assembled. Further, where there is a desire to offer the same vehicle in an electrically powered version as in a combustion-engine powered version, the line of spot welds used for assembling the floor elements to the chassis frame side members of the vehicle may not follow the same geometry for the electric vehicle as it does for the combustion engine vehicle. This then forces the need, in order to produce the two vehicles, to install two separate welding lines, thus increasing both development and production costs.

Patent application FR 2 915 452 describes a motor vehicle floor in which a rear part is raised with respect to a central part, the two parts are joined together by a support. The support comprises two crossmembers fixed to the central floor or to the chassis of the vehicle via two lateral supports.

Such a structure does not apply to electric or hybrid motor vehicles the central floor of which is raised in relation to the floors of combustion engines vehicles and does not allow load to be transferred between the chassis and a horizontal beam on which the seats are mounted.

Finally, by raising the central floor, the horizontal beams on which the seats are mounted have to be relocated. These horizontal beams are traditionally anchored to the central floor and to the two side skirt lateral flanks so as to transfer the load in the event of a side impact on the vehicle. By raising the central floor, the horizontal beams therefore tend to be raised up, so that they are no longer in direct contact with the side skirt lateral flanks, thus rendering the vehicle chassis less rigid.

It is an object of the invention to propose a chassis for an electric vehicle or for another vehicle which requires a large volume energy reserve, that allows electrically powered vehicles to be produced in parallel with combustion-engine-powered vehicles using a high number of components and production means in common.

It is another object of the invention to propose such a chassis which has a structure that is stiffened and capable of transferring load in the event of side impacts.

In one embodiment, the invention relates to a motor vehicle chassis comprising two side skirt lateral flanks comprising a horizontal portion for attachment to a central floor situated between the two side skirt lateral flanks, and at least one horizontal beam on which to mount the seats and mounted on the raised central floor of the vehicle and a housing for a reserve of energy situated under a horizontal main surface of the central floor. The horizontal portions of the side skirt and the main surface of the central floor exhibit a height difference because of the presence of the housing for the reserve of energy.

The motor vehicle chassis comprises connecting elements positioned on each side of the chassis and comprising a flat portion fixed to the central floor and an inclined portion fixed to one end of the horizontal beam, said inclined portion and flat portion being joined together and made as a single bent component, and the connecting element being fixed to the horizontal beam and to the central floor respectively, using welding.

The use of connecting elements makes it possible to ensure that load is transferred between the horizontal beam on which the seats are mounted and the side skirt lateral flanks. Thus, the elements that make up a chassis for a combustion engine powered motor vehicle can be used without major modification for electrically powered or hybrid vehicles the central floor of which is raised.

The connecting elements may be made of bent, pressed or welded sheet metal.

The inclined portion may for example be fixed to the internal surface of the horizontal beam.

For preference, the connecting elements comprise stiffening means for stiffening the junction between the inclined portion and the flat portion, such as ribs for example.

The inclined portion may comprise at least one flange for fixing to the horizontal beam and, for preference, two lateral flanges and a central fixing flange.

The lateral flanges my have a rounded cutout able to conform to the shape of the central floor of the vehicle and the height difference.

Advantageously, the central flange comprises at least one reinforcer able to stiffen the connecting element.

The inclined portion may further comprise a passage for electric cables.

Advantageously, each connecting element is fixed in such a way as to leave a gap between the inclined portion and a vertical part of the corresponding side skirt lateral flank, so as to leave access for a welding device that welds the chassis to the bodywork of the vehicle.

Figure 2:
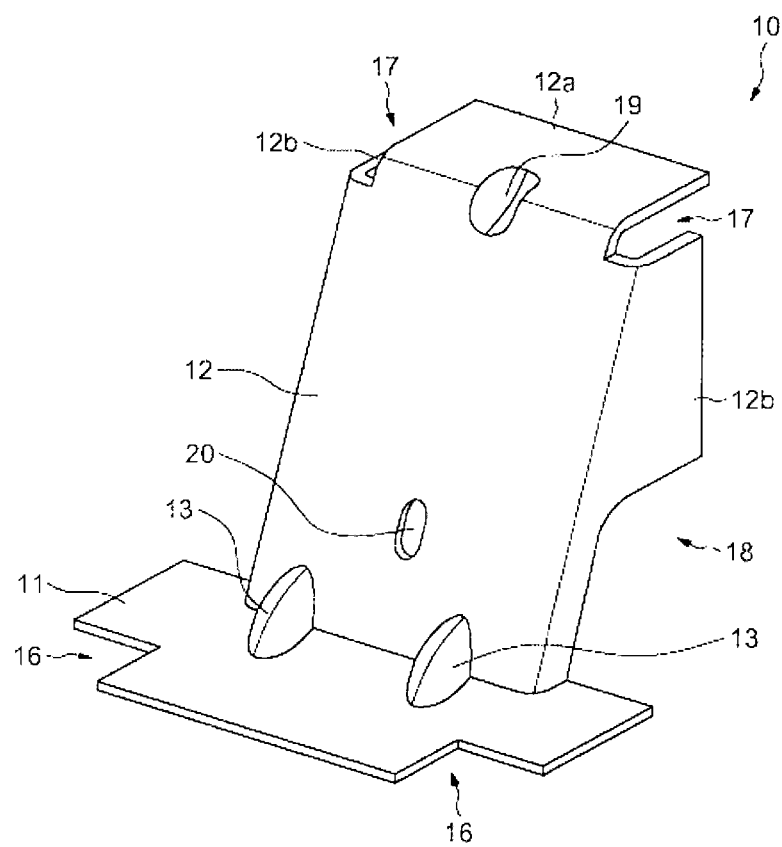
Figure 3:
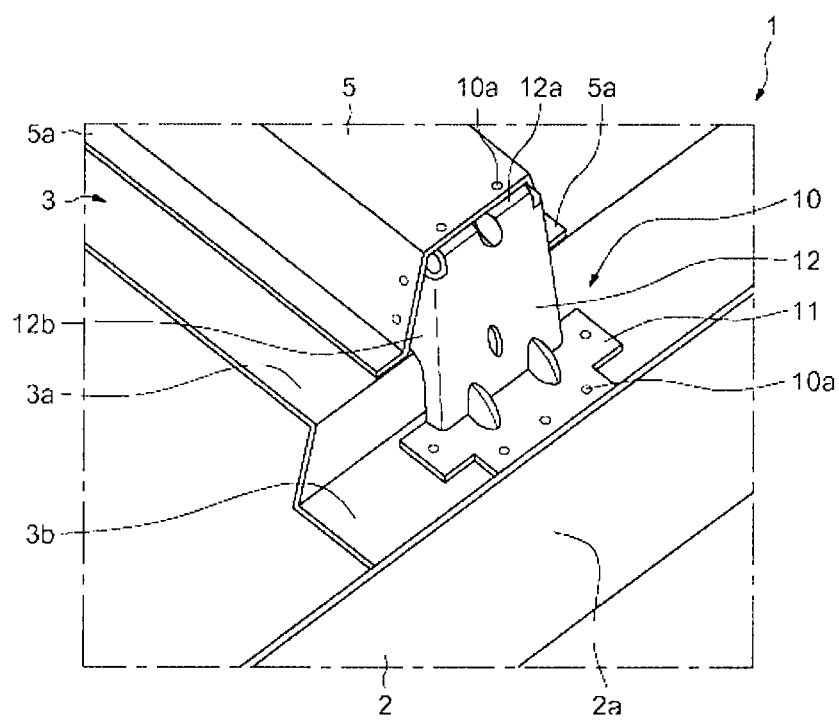

Other objects, features and advantages of the invention will become apparent from reading the following description, given solely by way of nonlimiting example and made with reference to the attached drawings in which:

FIG. 1 is a schematic view in cross section of part of a chassis according to the invention, FIG. 2 is a perspective view of one of the connecting elements visible in FIG. 1, and FIG. 3 is a partial view of the chassis of FIG. 1 in perspective from above.

As illustrated in FIG. 1, part of a chassis 1 is delimited laterally by two side skirt lateral flanks 2. What is meant by "chassis" is any assembly the overall shape of which is substantially parallelepipedal supporting the engine, the passenger compartment and the bodywork of a vehicle. A side skirt lateral flank, or skirt board, denotes a lateral part of a motor vehicle chassis intended to support the load.

Each side skirt lateral flank 2 comprises two vertical parts 2a joined together by a horizontal portion 2b for the fixing of the central floor 3. The side skirt lateral flanks 2 may be made of bent or pressed sheet metal. The central floor 3 comprises a horizontal main surface 3a and horizontal lateral surfaces 3b for the fixing of the central floor 3 to the horizontal portion 2b of the side skirt lateral flanks 2. The two horizontal surfaces 3a and 3b exhibit a height difference Z caused by the fact that a housing is formed under the central floor 3 in which to install accumulator batteries 4.

Horizontal transverse beams 5 are mounted on the horizontal main surface 3a of the central floor 3. Each horizontal beam 5 is made of sheet metal of hollow U-section so as to facilitate the routing of various electric cables (not depicted). These horizontal beams 5 also allow seats and/or bench seats 6 to be fixed to the central floor 3. As illustrated in FIG. 1, a seat 6 comprises a backrest 7 and a seat cushion 8 and is mounted on guide rails 9 which are fixed directly on one of the horizontal beams 5. The seat cushion 8 is generally made up of a support 8a made of a rigid material and of a padded cushion 8b incorporated into the support 8a made of a soft synthetic material. In vehicles that have two rows of seats 6, there are generally two of the horizontal beams 5.

The horizontal beams 5 and the side skirt lateral flanks 2 are joined together by connecting elements 10 positioned on each side of the chassis 1. Each connecting element 10, visible in FIG. 2, comprises a flat portion 11 fixed to the central floor 3 and an inclined portion 12 fixed to one end of a horizontal transverse beam 5. The two, flat 11 and inclined 12, portions may be produced as a single bent component or as two components welded together. However, for reasons of rigidity, the use of a one-piece component is more advantageous. In the example illustrated, two stiffening ribs 13 are formed where the flat 11 and inclined 12 portions meet, in order to stiffen the connecting element 10 still further.

Each horizontal transverse beam 5 connected on each side to a connecting element 10 acts as an impact absorber, protecting the occupants in the event of a side impact by dissipating the energy and spreading the load.

The inclined portion 12 of each connecting element 10 is fixed to the internal surface of the horizontal beam 5 by three flanges 12a, 12b, these being one central flange 12a and two lateral flanges 12b visible in FIG. 2. It will be noted that it is conceivable for the flanges 12a, 12b to be fixed to the external surface of the horizontal beam 5. The three flanges 12a, 12b are made by cutting and bending the inclined portion 12 made of sheet metal. The presence of three flanges makes this inclined portion 12 easier to create. It will be noted that it is, however, possible to conceive of an inclined portion 12 comprising a single flange 12a for fixing to the horizontal beam 5. The connecting element 10 is fixed to the horizontal beam 5 and to the central floor 3 respectively, preferably by welding.

Once the chassis 1 has been assembled, the side skirt lateral flanks 2 are welded to the vehicle bodywork 14. Thanks to the inclination of the inclined portion 12 of the connecting element 10 and to the position of this connecting element 10 in relation to the side skirt lateral flank 2, a gap D is left between the connecting element 10 and the vertical part 2a of the side skirt lateral flank 2, so as to allow a welding device 15 depicted very schematically in FIG. 1 to be inserted. The welding device 15 may, for example, be a welding head and allows the vertical part 2a to be welded to the vehicle bodywork 14, this being irrespective of the type (combustion engine or electric powered) of chassis to be manufactured.

One connecting element 10 is detailed in FIG. 2. As has been illustrated, the connecting element 10 comprises a flat portion 11 of rectangular section and an inclined portion 12 comprising three fixing flanges 12a, 12b. The flat portion 11, of rectangular shape, comprises two cutouts 16. It will be noted that a flat portion 11 having a rectangular or square base without cutouts 16 is also conceivable.

Two cutouts 17 are made one on each side of the central flange 12a to allow each of the two lateral flanges 12b to be bent over. Each of the lateral flanges 12b comprises a cutout 18 that is rounded so as to conform to the shape of the central floor 3 and the height difference Z illustrated in FIG. 1.

The two stiffening ribs 13 may be formed by deforming the metal sheet outwards at the junction between the flat 11 and inclined 12 portions so as to improve the stiffness of the connecting element 10. Likewise, a reinforcer 19 may be created where the inclined portion 12 and the central flange 12a meet so as to stiffen the central flange 12a. The reinforcer 19 may take the form of an inward deformation of the metal sheet.

In the example illustrated, the inclined portion 12 of the connecting element 10 comprises a passage 20 suited to accepting electric cables (not depicted) running across the horizontal beam 5. The passage 20 may have the form of an oblong hole so that several cables can be passed more easily through it. It will be noted that such a passage 20 could have any other shape and be used for attaching a cable fastener so as to fasten the cables along the central floor 3.

FIG. 3 illustrates a perspective partial view of part of the chassis 1 of FIG. 1. The part of the chassis 1 comprises the central floor 3 fixed to the side skirt lateral flank 2.

As illustrated in FIG. 3, the horizontal beam 5 comprises a peripheral flange 5a on each side produced by pressing the metal sheet. Each peripheral flange 5a represents a welding strip intended to be welded to the central floor 3. The connecting element 10 is fixed by spot welds 10a via the flanges 12a, 12b to the horizontal beam 5 and via the flat portion 11 to the central floor 3.

Assembly of the chassis 1 involves first of all fixing the central floor 3 to the side skirt lateral flanks 2. The connecting elements 10 then need to be fixed to the horizontal transverse beams 5, for example using welding, then the assembly formed by the horizontal beams 5 and the connecting elements 10 needs to be fixed to the central floor 3.

When the horizontal beams 5 and the connecting elements 10 have been fixed to the side skirt lateral flanks 2 via the central floor 3, the side skirt lateral flanks 2 can be fixed to the vehicle bodywork 14 using the welding device 15. The welding device 15 may consist of a two-branch welding head, the two branches 15a of which are positioned one on each side of the two portions of sheet metal 2a and 14 that respectively form part of the chassis 1 and of the bodywork of the vehicle. One of the branches of the head 15a is situated on the outside of the bodywork 14. The other branch of the head 15a may pass between the vertical part 2a of the side skirt lateral flank 2 and the connecting element or elements 12 situated on the same side thanks to the gap D that remains between the elements 12 and the vertical part 2a.

Thanks to the invention that has just been described, excellent load transfer between the side skirt and horizontal transverse beam or beams mounted on the raised floor is obtained.

Because of the raised position of the floor, it would not be possible to create a pressed horizontal transverse beam that extends as far as the side skirt. The addition of two connecting elements at each end of the horizontal transverse beam overcomes this difficulty while at the same time improving the rigidity of the whole and providing for load transfer in the event of a side impact.

In addition, the elements that make up a chassis for a combustion engine powered motor vehicle can be used without major modification for electrically powered or hybrid vehicles the central floor of which is raised. Thus, one and the same automatic assembly line can be used to produce electrically powered vehicles and combustion-engine-powered vehicles.

The invention claimed is:

1. A motor vehicle chassis comprising:
   two side skirt lateral flanks each comprising a horizontal portion for attachment to a raised central floor situated between the two side skirt lateral flanks;
   at least one horizontal beam on which to mount seats, and wherein the horizontal beam is mounted on the raised central floor of the vehicle;
   a housing for a reserve of energy situated under a horizontal main surface of the raised central floor, the horizontal portions of the side skirt lateral flanks and the main surface of the raised central floor exhibiting a height difference; and
   connecting elements positioned on each side of the chassis and comprising a flat portion fixed to the central floor and an inclined portion fixed to one end of the horizontal beam, the inclined portion and flat portion being joined together and made as a single bent component, and the connecting elements being fixed to the horizontal beam and to the raised central floor respectively, using welding.

2. The chassis as claimed in claim 1, wherein the connecting elements comprise stiffening means for stiffening a junction between the inclined portion and the flat portion.

3. The chassis as claimed in claim 1, wherein the inclined portion comprises at least one flange for fixing to the horizontal beam.

4. The chassis as claimed in claim 1, wherein the inclined portion comprises two lateral flanges and a central fixing flange.

5. The chassis as claimed in claim 4, wherein the lateral flanges have a rounded cutout configured to conform to a shape of the central floor of the vehicle and the height difference.

6. The chassis as claimed in claim 4, wherein the central flange comprises at least one reinforcer configured to stiffen the connecting element.

7. The chassis as claimed in claim 1, wherein the inclined portion comprises a passage for electric cables.

8. The chassis as claimed in claim 1, wherein each connecting element is fixed to leave a gap between the inclined portion and a vertical part of the corresponding side skirt lateral flank.

* * * * *